United States Patent
Cudak et al.

(10) Patent No.: US 9,906,559 B2
(45) Date of Patent: *Feb. 27, 2018

(54) SERVER WORKLOAD ASSIGNMENT BASED ON KNOWN UPDATE/SECURITY VULNERABILITIES

(71) Applicant: International Business Machines Corporation, Armonk, NY (US)

(72) Inventors: Gary D. Cudak, Wake Forest, NC (US); Christopher J. Hardee, Raleigh, NC (US); Adam Roberts, Moncure, NC (US); Adrian X. Rodriguez, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,142

(22) Filed: Oct. 9, 2015

(65) Prior Publication Data

US 2017/0104788 A1    Apr. 13, 2017

(51) Int. Cl.
*H04L 29/06* (2006.01)
*H04L 29/08* (2006.01)
*G06F 9/445* (2018.01)

(52) U.S. Cl.
CPC .............. *H04L 63/20* (2013.01); *G06F 8/62* (2013.01); *G06F 8/65* (2013.01); *H04L 63/1433* (2013.01); *H04L 67/10* (2013.01); *H04L 67/1008* (2013.01); *H04L 67/34* (2013.01)

(58) Field of Classification Search
CPC . H04L 63/20; H04L 63/1433; H04L 67/1008; H04L 67/34; H04L 67/10; G06F 8/65; G06F 8/62
See application file for complete search history.

(56) References Cited

U.S. PATENT DOCUMENTS

| | | |
|---|---|---|
| 8,572,750 B2 | 10/2013 | Patel et al. |
| 2004/0103412 A1* | 5/2004 | Rao ............... G06F 11/1433 717/171 |
| 2009/0119499 A1 | 5/2009 | Cao et al. |
| 2012/0173867 A1 | 7/2012 | Hirabayashi |
| 2013/0205128 A1* | 8/2013 | Thompson .......... H04L 41/0813 713/2 |

OTHER PUBLICATIONS

Cudak et al., "Server Workload Assignment Based on Known Update/Security Vulnerabilities", U.S. Appl. No. 14/879,453, filed Oct. 9, 2015.

(Continued)

*Primary Examiner* — Ghodrat Jamshidi
(74) *Attorney, Agent, or Firm* — Patterson + Sheridan, LLP

(57) ABSTRACT

Systems and computer program products to perform an operation comprising determining that a first component of a first compute node violates a compliance rule, wherein the first compute node executes a plurality of workloads and is of a plurality of compute nodes in a computing cluster, performing a predefined operation to defer need to apply a software update configured to correct the violation of the compliance rule by the first component of the first compute node, and executing, by the first compute node, at least one of the plurality of workloads without applying the software update.

14 Claims, 7 Drawing Sheets

(56) References Cited

OTHER PUBLICATIONS

IBM "List of IBM Patents or Patent Applications Treated As Related".
Hayden, CM. et al.; "Evaluating Dynamic Software Update Safety Using Systematic Testing"; IEEE Transactions on Software Engineering, vol. 38, No. 6, pp. 1340-1354, Nov.-Dec. 2012.
Anonymously; "Improved Software Update Management"; An IP.com Prior Art Database Technical Disclosure; http://ip.com/IPCOM/000218260D; May 30, 2012.
Anonymously; "A system and method to schedule a group event to improve overall work efficiency"; An IP.com Prior Art Database Technical Disclosure; http://ip.com/IPCOM/000228220D; Jun. 13, 2013.
Buchanan et al. "Apple Can Remotely Disable Apps Installed on Your iPhone", Gizmodo Aug. 6, 2008, pp. 1-6, retrieved Jun. 3, 2015 <http://gizmodo.com/5034007/apple-can-remotely-disable-apps-installed-on-your-iphone>.

\* cited by examiner

SERVER WORKLOAD ASSIGNMENT BASED ON KNOWN UPDATE/SECURITY VULNERABILITIES

BACKGROUND

The present invention relates to computing systems, and more specifically, to assigning workloads based on known updates and/or security vulnerabilities.

Software updates are frequently applied to computing devices for a variety of reasons, including fixing errors, addressing security vulnerabilities, and keeping software up to date. However, software updates may be distributed at times where the computing systems cannot apply the software updates. For example, a system may be in production, and services provided by the system cannot be taken offline to apply the update. Similarly, a system may not have the correct network connection to download the update. As another example, the update might be for unneeded software. Software updates are conventionally applied as soon as possible, in spite of the risks that may arise when doing so.

SUMMARY

Embodiments disclosed herein include systems and computer program products to perform an operation comprising determining that a first component on a first compute node, of a plurality of compute nodes in a computing cluster, violates a compliance rule, wherein the first compute node executes a plurality of workloads, wherein a software update is configured to correct the violation of the compliance rule by the first component of the first compute node, performing a predefined operation to defer applying the software update for a period of time, and executing, by the first compute node, at least one of the plurality of workloads during the period time.

DETAILED DESCRIPTION

Embodiments disclosed herein provide techniques to defer (or completely avoid) the need to apply software updates to computing systems. Instead of automatically applying a software update to a computing system, embodiments disclosed herein attempt to uninstall software, reconfigure workloads, or shift workloads to avoid the software at risk, and unable to negatively affect the computing system. Doing so may prolong the uptime of a system and avoid system downtime needed to apply software updates.

For example, developers may release an update that fixes security vulnerabilities of software package A. Compute node X in a compute cluster may execute a version of software package A that has not been updated to fix the security vulnerability. However, in order to apply the software update, compute node X (or a virtual machine hosting the software to be updated) may need to be restarted, which may take critical services offline. Instead of taking down compute node X, embodiments disclosed herein may defer (or obviate) the need to apply the update to software package A. For example and without limitation, administrators or management applications may uninstall software package A from compute node X in scenarios where software package A is not needed (or not used) on compute node X. Similarly, in another embodiment, the software update to software package A may be applied to compute node Y. Once software package A is updated on compute node Y, embodiments may migrate the services/workloads of compute node X to compute node Y. In still another embodiment, compute node Y may be prohibited or prevented from executing software package A, and will therefore not need to be updated before migrating services/workloads from compute node X to compute node Y. In another embodiment, workloads that are scheduled for deployment on compute node X may be rescheduled to accommodate the installation of the software update to software package A on compute node X. In each of these examples, installation of the update to software package A on compute node X may be deferred or completely rendered unnecessary, as compute node X will not use the affected software package X.

As used herein, a software update (or upgrade) may include any type of software update, regardless of the purpose of the software update. For example, the software update may fix or close security risks and/or vulnerabilities, correct runtime errors, correct dropped connections, or upgrade out of date software versions to a more current version. The software updates may target any type of computing element, including computing hardware, firmware, and/or software.

Figure 1:
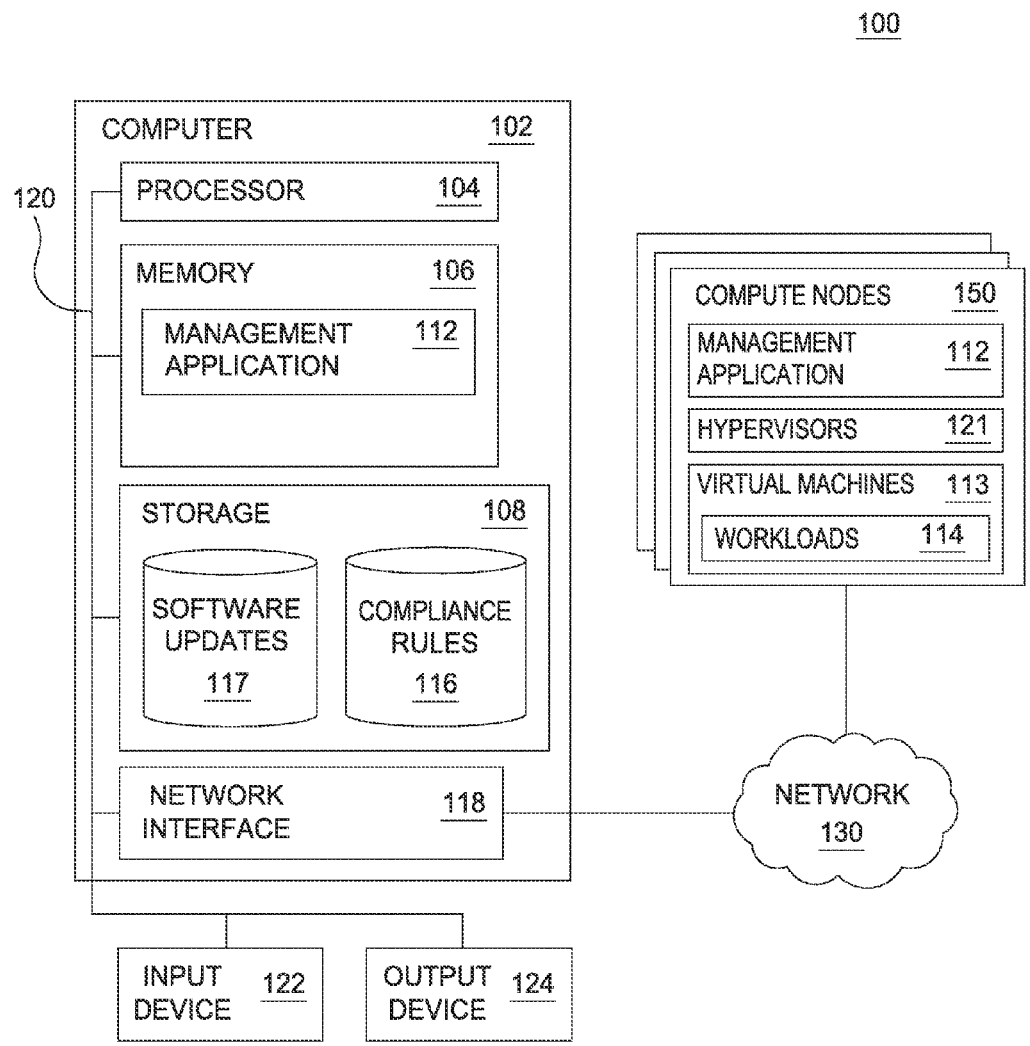
FIG. 1 illustrates a system configured to assign workloads based on known updates and/or security vulnerabilities, according to one embodiment.

FIG. 1 illustrates a system 100 configured to assign workloads based on known updates and/or security vulnerabilities, according to one embodiment. The networked system 100 includes a computer 102. The computer 102 may also be connected to other computers via a network 130. In at least one embodiment, the system 100 depicts a computing cluster comprising the computer 102 and a plurality of compute nodes 150. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains the management application 112, which is an application generally configured to intelligently manage workloads on the compute nodes 150 based on known software updates. In addition, the management application 112 generally manages the deployment and management of virtual machines 113 and their workloads 114 on the compute nodes 150. One example of such a management application is xCAT (Extreme Cloud Administration Toolkit), developed by IBM, which is configured to manage the compute nodes 150 by interfacing with a plurality of different hypervisors 121. Generally, a hypervisor 121 creates, manages, and runs virtual machines 113 on the compute nodes 150. The virtual machines 113 may execute any type of software, including the workloads 114. The workloads 114 may be services or collections of code that can be executed.

As shown, the storage 108 contains the compliance rules 116 and software updates 117. The software updates 117 may include any type of updates for software and/or firmware. For example, the software updates 117 may include patches, fixes, new versions of software, and the like. The software updates 117 may be enriched with metadata specifying targets (hardware, software, and/or firmware) and other attributes of each update. The compliance rules 116 may include different rules for software and/or hardware components of the compute nodes 150. The management application 112 may automatically generate compliance rules 116 responsive to receiving indications of software updates 117, security vulnerabilities, and the like. In other embodiments, the compliance rules 116 may be defined by a user, such as a system administrator.

For example, the compliance rules 116 may specify the most current versions of software and/or firmware. If the management application 112 determines that a compute node 150 is not running the most current version of the software, the management application 112 may perform predefined operations to delay or obviate the need to install an update to the software so that the compliance rules 116 are satisfied. As another example, the compliance rules 116 may specify security vulnerabilities, threats, loopholes, and the like, which may require a software update 117 to be fixed. If a given compute node 150 has not received the corresponding software update 117, the management application 112 may determine that the compute node 150 violates the compliance rule 116, and the management application 112 may attempt to orchestrate installation of the software update according to the techniques described herein. As another example, the compliance rules 116 may identify hardware components that are not acceptable for use in the compute nodes 150. For example, a network adapter may be known to cause data corruption. If a compute node 150 includes the offending network adapter, the management application 112 may disable the offending network adapter so that it does not corrupt any more data. In addition, if an update for the network adapter is in the software updates 117, the management application 112 may adjust the deployment of virtual machines 113 and/or workloads 114 such that the offending network adapter is not used until the software update 117 is applied. Generally, the compliance rules 116 may specify any number and type of rules that are associated with one or more software updates 117. The compliance rules 116 may also specify corresponding operations that the management application 112 may perform to cause the compute nodes 150 to come into compliance with a given compliance rule 116.

For example, one compliance rule 116 may specify that version 1.0 of a software compiler has a security vulnerability which may be fixed by updating the compiler to version 1.1 through an update stored in the software updates 117. The management application 112 may then determine that a first virtual machine 113 on first compute node 150 includes version 1.0 of the compiler. In response to the violation of the compliance rule 116 related to the compiler, the management application 112 may perform a predefined operation to delay and/or obviate the need to update the compiler. In one embodiment, the management application 112 may identify one or more enumerated operations associated with the compliance rule 116. In another embodiment, the management application 112 includes a set of predefined operations that may be applied across all types of rule violations. For example, the first virtual machine 113 may execute a first, second, and third workload 114, where only the first workload 114 utilizes version 1.0 of the compiler. In such a scenario, the management application 112 may move the first workload 114 to a second compute node 150, where the second compute node 150 includes version 1.1 of the compiler. In at least one embodiment, the management application 112 may interface with the hypervisor 121 managing the first virtual machine to move the first workload 114 to a different compute node. The management application 112 may also allow the second and third workloads 114 to run unmodified, as the second and third workloads 114 do not use the offending compiler, and the risks associated with version 1.0 of the compiler may be avoided without requiring the update to version 1.1 of the compiler. Generally, the management application 112 may perform any predefined operation to address the violation of a compliance rule 116. For example, if version 1.0 of the compiler is not used on a given system, the management application 112 may uninstall version 1.0 of the compiler, and store an indication in the storage 108 to reinstall version 1.1 of the compiler at a later time.

In at least one embodiment, the hypervisors 121 may incorporate the functionality of the management application 112 that assigns server workload based on software updates and/or security vulnerabilities. For example, in one example environment, the computer 102 may also host a hypervisor 121 that manages a set of virtual machines 113 and associated workloads 114 in the memory 106. In such environments, the management application 112 may not be required to interface between different virtualized environments (and their respective hypervisors 121). Therefore, the hypervisor 121 may identify software updates 117 for installation on the computer 102, and perform predefined operations to delay and/or obviate the need to install the software updates on the computer 102.

Figure 2:
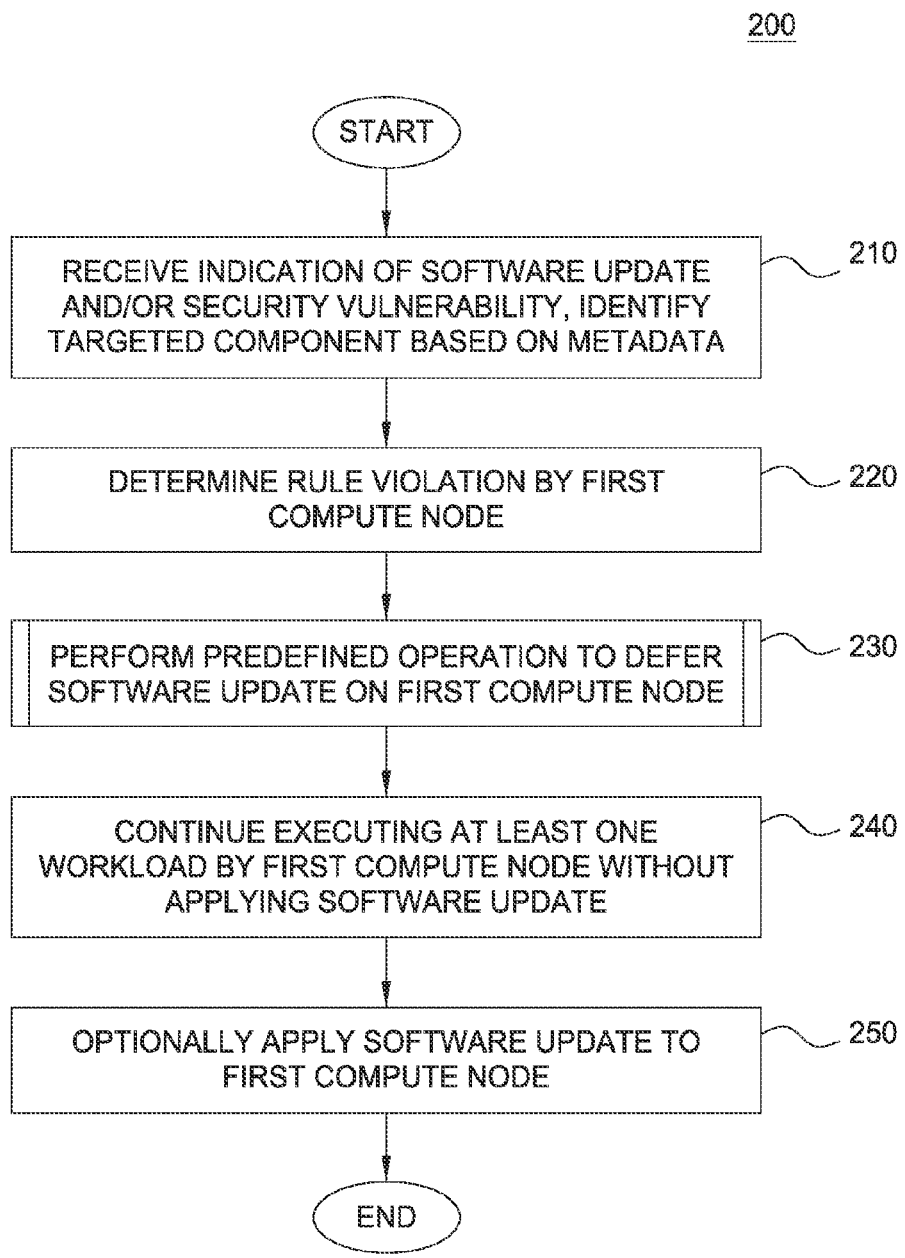
FIG. 2 illustrates a method to assign workloads based on software updates, according to one embodiment.

FIG. 2 illustrates a method 200 to assign workloads based on software updates, according to one embodiment. Generally, the steps of the method 200 provide techniques to defer or eliminate the need to install software updates upon receipt. As shown, the method 200 begins at step 210, where the management application 112 may receive an indication of a software update, security vulnerability, or other required software upgrade in the software updates 117. In at least one embodiment, a user may provide the indication. In response, the management application 112 may reference metadata associated with the software updates 117 to identify a component of the computing system targeted by the software update 117. For example, a first software update 117 may target a security vulnerability in an operating system, while a second software update 117 may target flawed firmware of a hardware component. At step 220, the management application 112 may determine that a first compute node violates a compliance rule related to the software update (or security vulnerability). For example, if a critical security fix is received for an operating system, the management application 112 may determine that the operating system of a first virtual machine 113 executing on the first compute node has not been updated based on metadata associated with the operating system provided by the hypervisor 121 managing the first virtual machine. In at least one embodiment, the management application 112 may maintain a database of all installed software and hardware components of each compute node 150 in the storage 108, thereby facilitating the determination as to which components violate compliance rules 116.

At step 230, described in greater detail with reference to FIG. 3, the management application 112 may perform a predefined operation to defer (and/or eliminate) the need to apply the software update to the first compute node. Generally, the management application 112 may perform any set of operations to ensure that the offending hardware and/or software is not used. For example, continuing with the previous example, if the operating system security fix is the required software update 117, the management application 112 may migrate workloads 114 associated with the first virtual machine 113 on the first compute node 150 to a virtual machine 113 on a second compute node. If, however, a second virtual machine 113 is not affected, the management application 112 may allow the second virtual machine 113 to continue execution on the first compute node 150 while the first virtual machine 113 is updated and rebooted. At step 240, the first compute node may continue executing at least one workload 114 without applying the software update. For example, a first workload 114 may be migrated to a second compute node 150 because the first workload 114 uses a component of the first compute node 150 that is targeted by a software update. However, a second workload 114 executing on the first compute node 150 may not be modified, as the second workload 114 may not use the component of the first compute node 150 that is targeted by the software update. At step 250, the management application 112 may optionally apply the software update to the first compute node.

Figure 3:
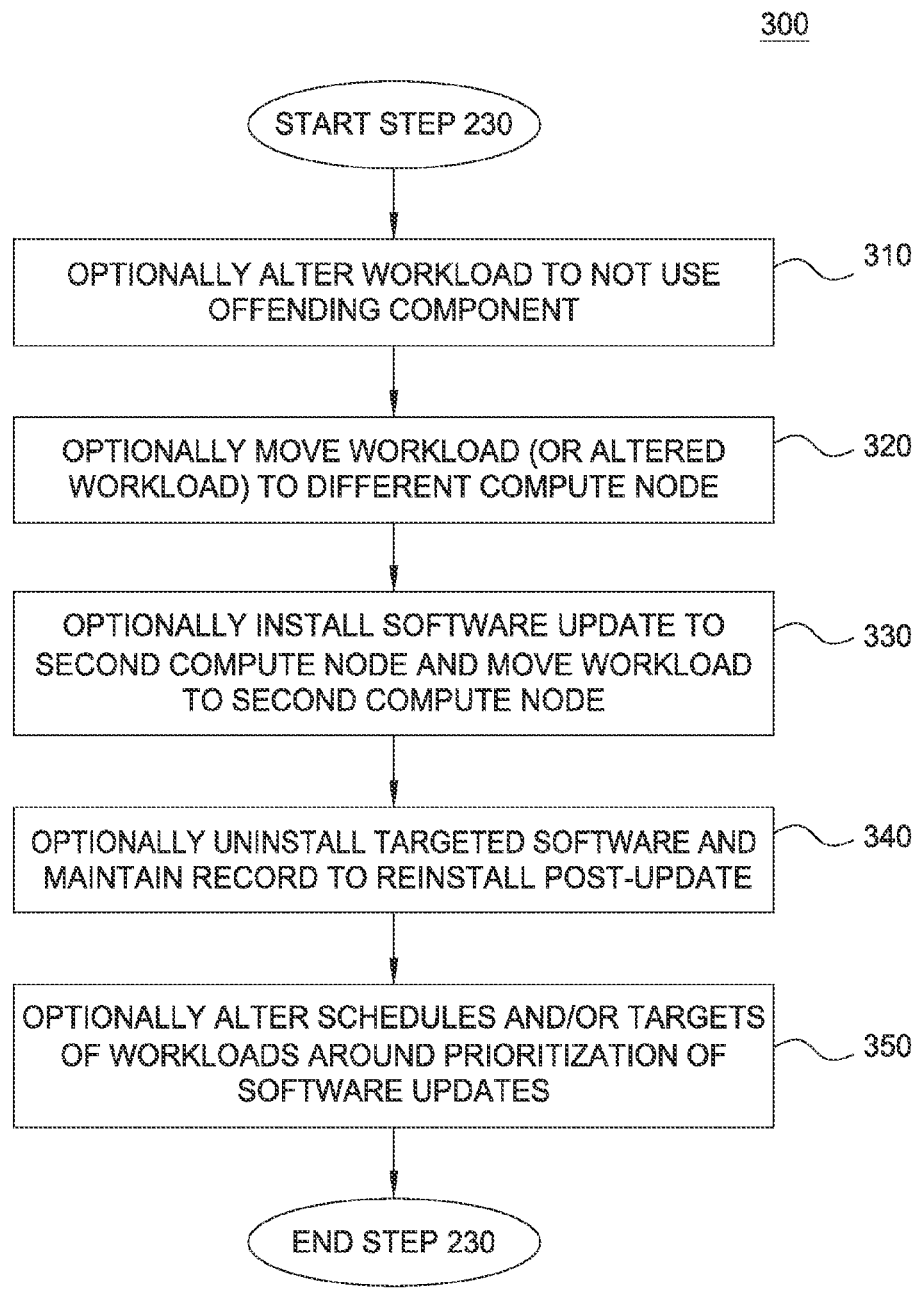
FIG. 3 illustrates a method to perform a predefined operation to defer the need to apply a software update, according to one embodiment.

FIG. 3 illustrates a method 300 corresponding to step 230 to perform a predefined operation to defer the need to apply a software update, according to one embodiment. Generally, the method 300 includes one or more operations that the management application 112 may perform to defer or eliminate the need to apply a software update. At step 310, the management application 112 may optionally alter a workload 114 to not use an offending component. For example, if a workload 114 uses a software package, compiler, network port, or operating system component that is the target of a software update, the management application 112 may provide a suitable alternate component that is determined to not violate any compliance rules 116. At step 320, the management application 112 may optionally move one or more workloads to a different compute node. For example, if the second compute node is not affected, the workload may be moved to the second compute node, allowing the workloads to run while the software update is applied to the first compute node. At step 330, the management application 112 may optionally install the software update 117 to a second compute node, and move affected workloads from the first compute node to the second compute node. At step 340, the management application 112 may optionally uninstall the software targeted by a software update 117, and maintain a record to re-install the updated software at a later time (such as after a system reboot). At step 350, the management application 112 may optionally alter the schedules and/or targets (e.g., compute nodes) of workloads around prioritization of software updates. For example, an administrator may define a daily window of time for applying software updates, such as from 3 AM-4 AM. Therefore, workloads that may be affected can be scheduled to run around the updates.

Figure 4A:
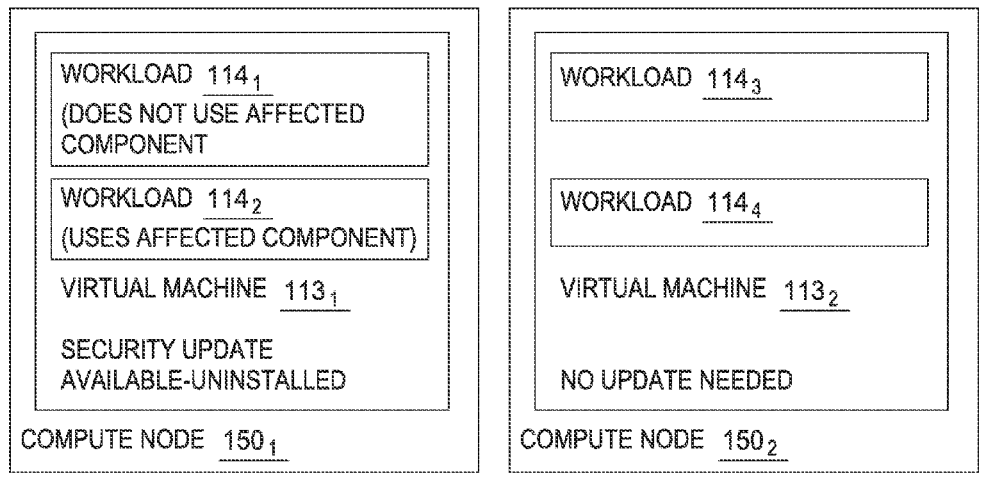
FIGS. 4A-4B illustrate techniques to assign workloads based on software updates, according to various embodiments.

FIG. 4A illustrates techniques to assign workloads based on software updates, according one embodiment. As shown, FIG. 4A depicts two compute nodes, namely compute nodes $150_1$ and $150_2$, which execute virtual machines $113_1$ and $113_2$, respectively. Virtual machine $113_1$ executes workloads $114_1$ and $114_2$, while virtual machine $113_2$ executes workload $114_3$ and workload $114_4$. As shown, virtual machine $113_1$ is targeted by a security update which has not been installed. The security update may be any type of update, such as a patch to close an open security loophole. The management application 112 may determine that workload $114_1$ does not use the component targeted by the uninstalled security update, while workload $114_2$ does use the component affected by the uninstalled security update. As shown, no updates are ready for installation on compute node $150_2$. As such, the management application 112 may modify the configuration of compute node $150_1$ to delay or obviate the need to install the security patch on compute node $150_1$.

Figure 4B:
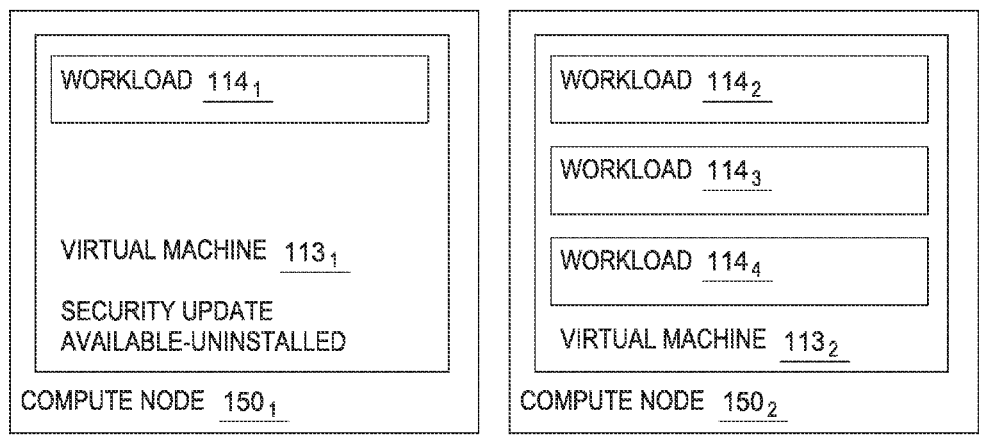

FIG. 4B reflects compute nodes $150_1$, $150_2$ after the management application 112 has caused the migration of workload $114_2$ to virtual machine $113_2$ of compute node $150_2$. As shown, virtual machine $113_1$ of compute node $150_1$ continues to execute workload $114_1$, but no longer executes $114_2$. The security update is still available, but has not been installed, allowing workload $114_1$ to continue to execute. However, since workload $114_2$ has been migrated to compute node $150_2$, the risk of not installing the upgrade is minimized, as workload $114_1$ does not use the affected component that has not been addressed by the security update. Advantageously, the security update may be installed at a later time. As shown, virtual machine $113_2$ now runs workloads $114_2$, $114_3$, and $114_4$. However, in one embodiment, the management application 112 may migrate one or both of workloads $114_3$ and $114_4$ to compute node $150_1$ (assuming neither workload $114_3$ nor workload $114_4$ uses the affected component of compute node $150_1$).

Advantageously, embodiments disclosed herein defer or completely obviate the need to apply software updates. While software updates are conventionally applied immediately upon receipt, embodiments disclosed herein alter or move computing workloads to avoid the use of offending hardware and/or software until the software update can be applied at a later time. Doing so provides increased uptime of key services and reduces overall downtime.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
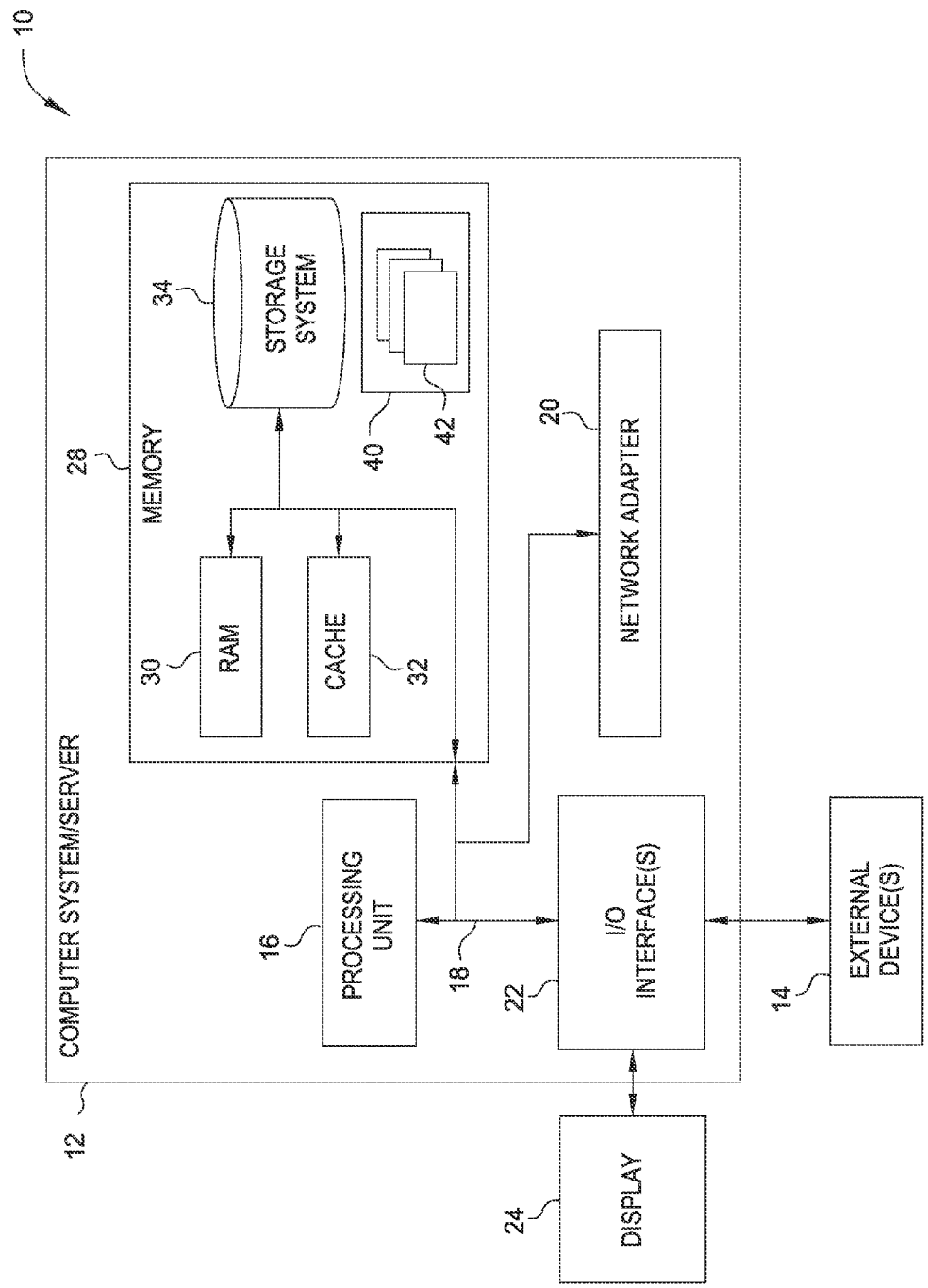
FIG. 5 depicts a cloud computing node according to one embodiment.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
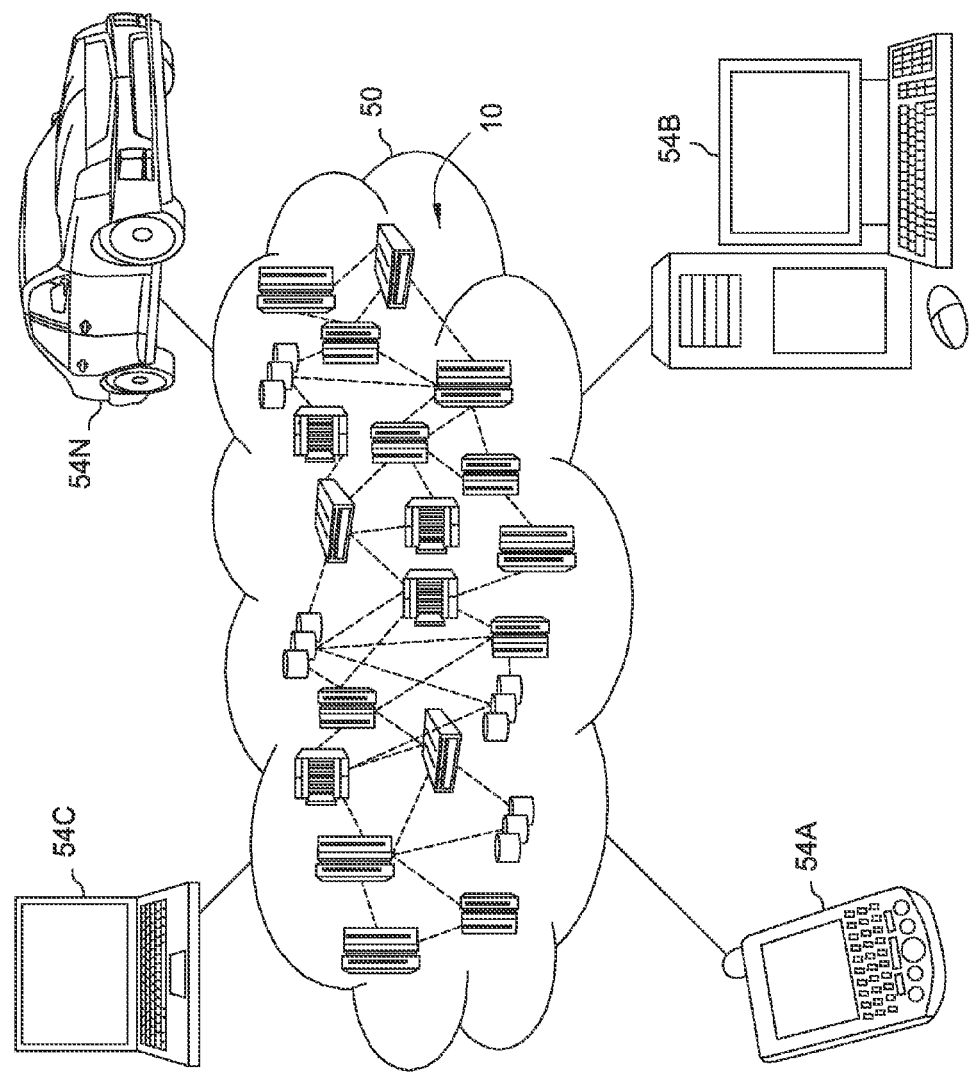
FIG. 6 depicts a cloud computing environment according to one embodiment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
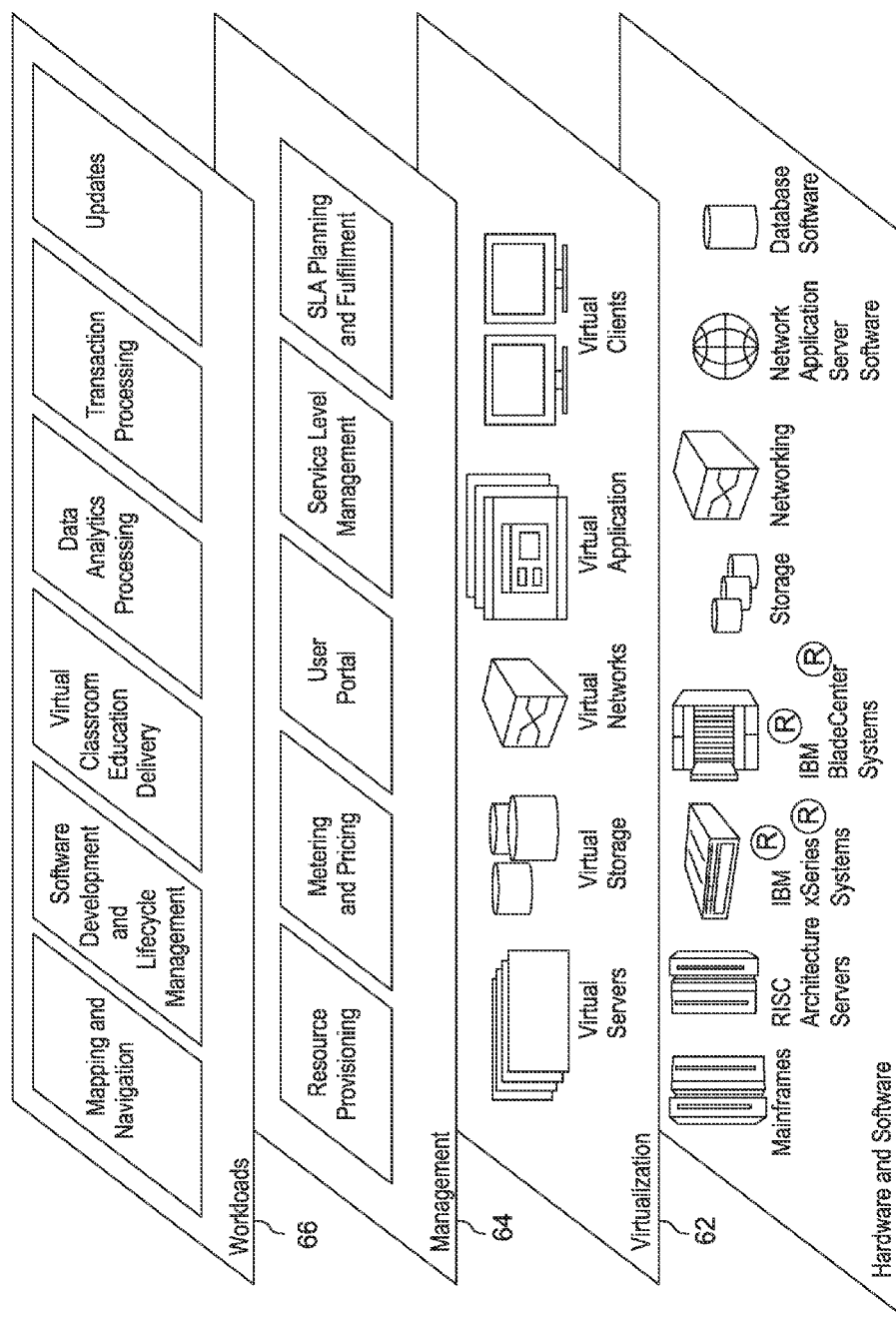
FIG. 7 depicts abstraction model layers according to one embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and software updates.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing cluster, comprising:
a plurality of compute nodes in a computing cluster, each of the compute nodes comprising at least one processor; and
a management system comprising one or more processors configured to manage the plurality of compute nodes by performing an operation comprising:
determining that a first component on a first compute node, of the plurality of compute nodes in the computing cluster, violates a compliance rule, wherein the first compute node executes a plurality of workloads, wherein a software update is configured to correct the violation of the compliance rule by the first component of the first compute node;
identifying one or more predefined operations associated with the compliance rule; and
performing the one or more predefined operations while deferring applying the software update for a period of time; and
executing, by the first compute node, at least one of the plurality of workloads during the period of time.

2. The computing cluster of claim 1, wherein the one or more predefined operations comprises a first predefined operation to defer applying the software update to the first compute node for the period of time and a second predefined operation to restrict use of the first compute node during the period of time, and wherein the first component comprises at least one of: (i) a firmware of a hardware component of the first compute node, (ii) a software component of at least one of the plurality of workloads, (iii) a software component configured to manage the plurality of workloads of the first compute node, and (iv) a first workload, of the plurality of workloads.

3. The computing cluster of claim 2, wherein the first component comprises the first workload, wherein the one or more predefined operations comprise at least one of: (i) disabling the first workload, (ii) altering the first workload, and (iii) moving the first workload to a second compute node of the plurality of compute nodes, wherein the second compute node does not violate the compliance rule.

4. The computing cluster of claim 2, wherein the first component comprises the software component of at least one of the plurality of workloads, wherein the one or more predefined operations comprise at least one of: (i) uninstalling the software component from the at least one of the plurality of workloads, (ii) disabling the software component from the at least one of the plurality of workloads, (iii) moving the at least one of the plurality of workloads to a second compute node of the plurality of compute nodes, wherein the second compute node does not violate the compliance rule.

5. The computing cluster of claim 2, wherein the first component comprises the firmware of the hardware component of the first compute node, wherein the one or more predefined operations comprise:
identifying a first set of workloads, of the plurality of workloads, that interact with the hardware component; and
moving the first set of workloads to a second compute node of the plurality of compute nodes, wherein the second compute node does not violate the compliance rule, wherein the at least one of the plurality of workloads executed by the first compute node without applying the software update comprise a second set of workloads that do not interact with the hardware component.

6. The computing cluster of claim 1, wherein the violation of the compliance rule comprises at least one of: (i) executing, by the first compute node, an out of date software module, (ii) executing, by the first compute node, a software component that has a security vulnerability, and (iii) executing, by the first compute node, a software component experiencing a runtime error.

7. The computing cluster of claim 1, wherein the first component is determined to violate the compliance rule based on metadata associated with the software update relative to at least one attribute of the first component.

8. The computing cluster of claim 1, wherein the one or more predefined operations associated with the compliance rule are configured to correct the violation of the compliance rule.

9. A computer program product comprising:
a computer-readable storage medium having computer-readable program code embodied therewith, the computer-readable program code executable by one or more computer processors to perform an operation comprising: determining that a first component on a first compute node, of a plurality of compute nodes in a computing cluster, each of the compute nodes comprising at least one processor, violates a compliance rule, wherein the first compute node executes a plurality of workloads, wherein a software update is configured to correct the violation of the compliance rule by the first component of the first compute node;
identifying one or more predefined operations associated with the compliance rule; and
performing the one or more predefined operations while deferring applying the software update for a period of time; and
executing, by the first compute node, at least one of the plurality of workloads during the period of time.

10. The computer program product of claim 9, wherein the one or more predefined operations comprises a first predefined operation to defer applying the software update to the first compute node for the period of time and a second predefined operation to restrict use of the first compute node during the period of time, and wherein the first component comprises at least one of: (i) a firmware of a hardware component of the first compute node, (ii) a software component of at least one of the plurality of workloads, (iii) a software component configured to manage the plurality of workloads of the first compute node, and (iv) a first workload, of the plurality of workloads.

11. The computer program product of claim 10, wherein the first component comprises the first workload, wherein the one or more predefined operations comprise at least one of: (i) disabling the first workload, (ii) altering the first workload, and (iii) moving the first workload to a second compute node of the plurality of compute nodes, wherein the second compute node does not violate the compliance rule.

12. The computer program product of claim 10, wherein the first component comprises the software component of at least one of the plurality of workloads, wherein the one or more predefined operations comprise at least one of: (i) uninstalling the software component from the at least one of the plurality of workloads, (ii) disabling the software component from the at least one of the plurality of workloads, (iii) moving the at least one of the plurality of workloads to a second compute node of the plurality of compute nodes, wherein the second compute node does not violate the compliance rule.

13. The computer program product of claim 10, wherein the first component comprises the firmware of the hardware component of the first compute node, wherein the one or more predefined operations comprise:
identifying a first set of workloads, of the plurality of workloads, that interact with the hardware component; and
moving the first set of workloads to a second compute node of the plurality of compute nodes, wherein the second compute node does not violate the compliance rule, wherein the at least one of the plurality of workloads executed by the first compute node without applying the software update comprise a second set of workloads that do not interact with the hardware component.

14. The computer program product of claim 9, wherein the first component is determined to violate the compliance rule based on metadata associated with the software update relative to at least one attribute of the first component, wherein the violation of the compliance rule comprises at least one of: (i) executing, by the first compute node, an out of date software module, (ii) executing, by the first compute node, a software component that has a security vulnerability, and (iii) executing, by the first compute node, a software component experiencing a runtime error.

* * * * *